US012680872B2

(12) United States Patent
Wang et al.

(10) Patent No.: US 12,680,872 B2
(45) Date of Patent: Jul. 14, 2026

(54) TWO-DIMENSIONAL HYPERSPECTRAL IMAGING SYSTEM AND METHOD THEREOF

(71) Applicant: National Tsing Hua University, Hsinchu (TW)

(72) Inventors: Wei-Chih Wang, Sammamish, WA (US); Fiona Marie Wang, Seattle, WA (US)

(73) Assignee: National Tsing Hua University, Hsinchu (TW)

( * ) Notice: Subject to any disclaimer, the term of this patent is extended or adjusted under 35 U.S.C. 154(b) by 135 days.

(21) Appl. No.: 18/205,618

(22) Filed: Jun. 5, 2023

(65) Prior Publication Data

US 2024/0402011 A1    Dec. 5, 2024

(51) Int. Cl.
| | |
|---|---|
| *G01J 3/28* | (2006.01) |
| *G01J 3/02* | (2006.01) |
| *G01J 3/453* | (2006.01) |

(52) U.S. Cl.
CPC ........... *G01J 3/2823* (2013.01); *G01J 3/0224* (2013.01); *G01J 3/4535* (2013.01); *G01J 2003/2826* (2013.01)

(58) Field of Classification Search
CPC ...... G01J 3/2823; G01J 3/0224; G01J 3/4535; G01J 2003/2826
See application file for complete search history.

(56) References Cited

U.S. PATENT DOCUMENTS

| | | | |
|---|---|---|---|
| 6,466,961 B1 * | 10/2002 | Miller | G01J 3/457 |
| | | | 708/819 |
| 10,488,678 B1 * | 11/2019 | Lemoff | H04N 23/57 |
| 12,044,921 B2 * | 7/2024 | Mansha | G02F 1/133567 |
| 2002/0126279 A1 * | 9/2002 | Kung | G01J 3/0229 |
| | | | 356/328 |
| 2010/0231817 A1 | 9/2010 | Ide et al. | |
| 2011/0299089 A1 * | 12/2011 | Wang | G01J 3/4531 |
| | | | 349/1 |
| 2014/0354999 A1 * | 12/2014 | Englund | G01J 3/45 |
| | | | 356/456 |
| 2016/0062112 A1 | 3/2016 | Potsaid et al. | |
| 2016/0127661 A1 * | 5/2016 | Hegyi | G01J 3/0229 |
| | | | 348/164 |
| 2017/0241766 A1 | 8/2017 | Arieli et al. | |
| 2021/0181022 A1 | 6/2021 | Manzoni et al. | |

(Continued)

*Primary Examiner* — Michelle M Iacoletti
*Assistant Examiner* — Maher Yazback

(57) ABSTRACT

A two-dimensional hyperspectral imaging system for imaging a plurality of light signals of a sample by Fourier spectroscopy includes a first optical element, a second optical element, a phase difference modulator and an image sensor. The light signals pass by the first optical element. The second optical element is spaced away from and parallel to the first optical element, and the light signals pass by the second optical element. The phase difference modulator is closer to the first optical element than the second optical element to the first optical element, and configured for modifying a phase difference of adjacent two of the light signals. The image sensor is configured for receiving the light signals reflected from the first optical element and the second optical element, and operating Fourier transforming on the light signals. The second optical element is between the first optical element and the image sensor.

17 Claims, 18 Drawing Sheets

(56) References Cited

U.S. PATENT DOCUMENTS

| | | | | |
|---|---|---|---|---|
| 2023/0215888 A1* | 7/2023 | Roh | ................. | H01L 27/14629 |
| | | | | 257/292 |
| 2023/0304925 A1* | 9/2023 | Shu | ........................... | G01J 3/26 |
| 2023/0359098 A1* | 11/2023 | Abdulhalim | .......... | G02F 1/1334 |
| 2023/0402485 A1* | 12/2023 | Borremans | ....... | H01L 27/14621 |
| 2024/0019306 A1* | 1/2024 | Choi | ...................... | H04N 23/55 |

* cited by examiner

3700

3000

S

L

LC

S100

S110

Emitting a light passing through the sample to generate the light signals by a light source

S120

Reflecting the light signals between at least one first optical element and at least one second optical element

S130

Receiving the light signals and operating Fourier transforming on the light signals by an image sensor

TWO-DIMENSIONAL HYPERSPECTRAL IMAGING SYSTEM AND METHOD THEREOF

BACKGROUND

Technical Field

The present disclosure relates to an imaging system and method thereof. More particularly, the present disclosure relates to a two-dimensional hyperspectral imaging system and method thereof for imaging light signals of a sample.

Description of Related Art

Imaging spectrometers have been applied to a variety of disciplines, such as the detection of defects in industrial processes, satellite imaging, and laboratory research. These instruments detect radiation from a sample and process the resulting signal to obtain and present an image of the sample that includes spectral and chemical information about the sample. A few imaging spectrometers have been proposed that employ a variable-bandwidth filter. Such spectrometers generally include dispersive elements to limit the Spectral information received by the array, or slits, apertures, or shutters to limit the spatial information received by the array. Thus, the conventional imaging spectrometers have certain limitations and cannot be used variously.

In the present disclosure, we disclose a two-dimensional hyperspectral imaging system which includes Fabry-Perot interferometer based Fourier spectrometer system and can be incorporated into each image detector so that each spatial detector can provide both images of the target area and its spectral information. The current embodiments allow for the application of various spectroscopy techniques: most notably Raman scattering spectroscopy, elastic scattering spectroscopy (ESS), and optical emission spectroscopy (OES). These different techniques present different advantages and disadvantages in different scenarios making the presented embodiment a universal hyperspectral image system.

SUMMARY

According to one aspect of the present disclosure, a two-dimensional hyperspectral imaging system for imaging a plurality of light signals of a sample by Fourier spectroscopy includes at least one first optical element, at least one second optical element, a phase difference modulator and an image sensor. The light signals pass by the first optical element. The second optical element is spaced away from and parallel to the first optical element, and the light signals pass by the second optical element. The phase difference modulator is closer to the first optical element than the second optical element to the first optical element, and configured for modifying a phase difference of adjacent two of the light signals. The image sensor is configured for receiving the light signals reflected from the first optical element and the second optical element, and operating Fourier transforming on the light signals. The second optical element is between the first optical element and the image sensor. When the light signals pass by the first optical element, the second optical element and the image sensor in order, the adjacent two of the light signals are constructive interference by modifying the phase difference with the phase difference modulator.

According to one aspect of the present disclosure, a two-dimensional hyperspectral imaging method for imaging a plurality of light signals of a sample by Fourier spectroscopy includes emitting a light passing through the sample to generate the light signals by a light source, reflecting the light signals by at least one first optical element and at least one second optical element, wherein a phase difference between adjacent two of the light signals is modified to be constructive interference by an phase difference modulator, and receiving the light signals and operating Fourier transforming on the light signals by an image sensor.

According to one aspect of the present disclosure, a two-dimensional hyperspectral imaging method for imaging a plurality of light signals of a sample by Fourier transformation includes emitting a light passing through the sample to generate the light signals by a light source, polarizing each of the light signals by at least one first optical element orthogonally, changing a phase difference of adjacent two of the light signals which are orthogonal to each other and then polarizing each of the light signals by at least one second optical element, so that the adjacent two of the light signals which are orthogonal to each other are constructive interference, and receiving the light signals and operating Fourier transforming on the light signals by an image sensor.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1A:
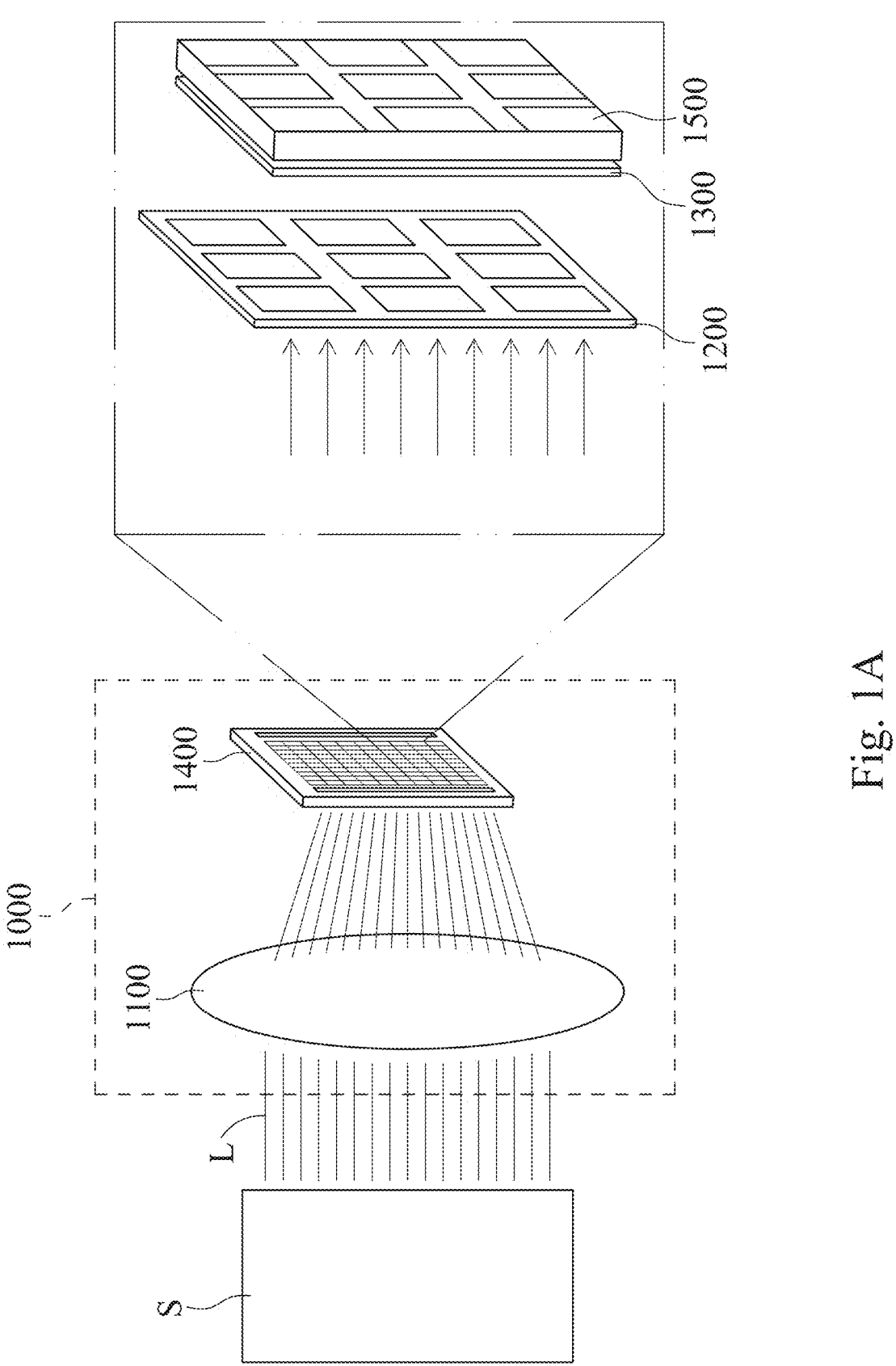
FIG. 1A shows a schematic view of a two-dimensional hyperspectral imaging system receiving a plurality of light signals of a sample according to a first embodiment of the present disclosure.
Figure 1B:
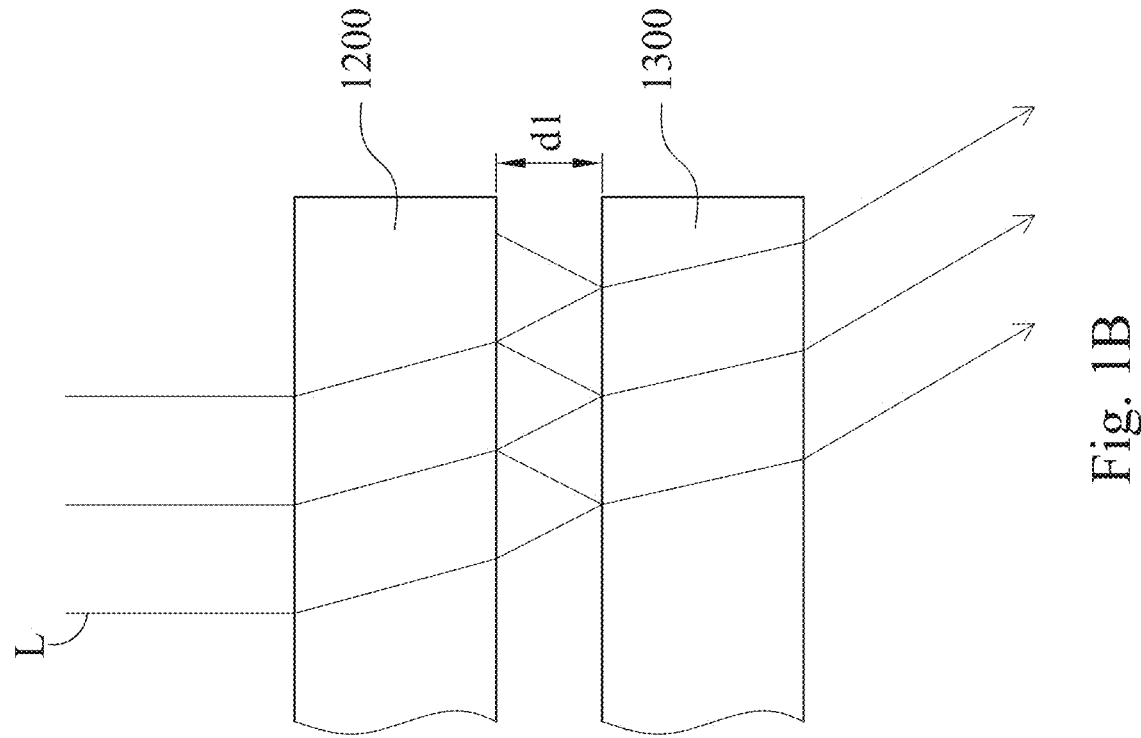
FIG. 1B shows a schematic view of the light signals passing through the first optical element and the second optical element according to the first embodiment in FIG. 1A.
Figure 2:
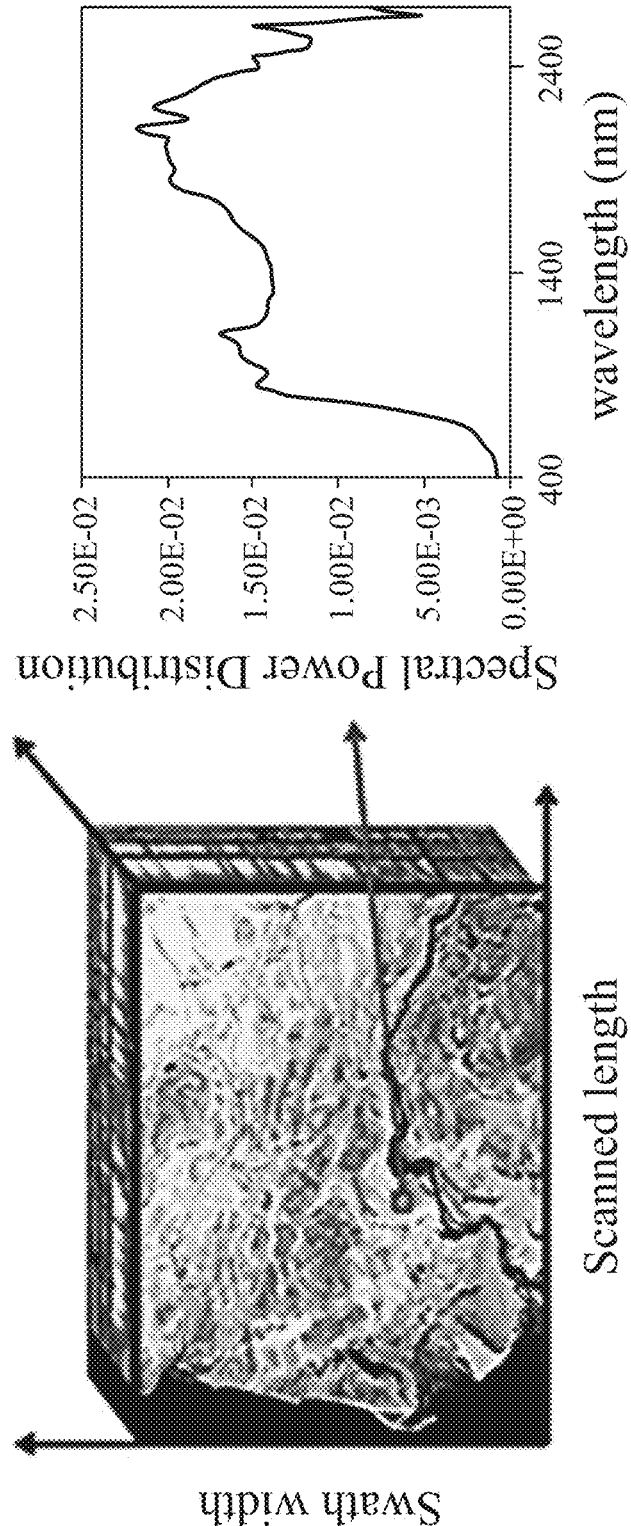
FIG. 2 shows a hyperspectral image analyzed in the conventional art.

FIG. 1A shows a schematic view of a two-dimensional hyperspectral imaging system 1000 receiving a plurality of light signals L of a sample S according to a first embodiment of the present disclosure. FIG. 1B shows a schematic view of the light signals passing through the first optical element 1200 and the second optical element 1300 according to the first embodiment in FIG. 1A. FIG. 2 shows a hyperspectral image analyzed in the conventional art. As show in FIGS. 1A, 1B and 2. The two-dimensional hyperspectral imaging system 1000 is for imaging the light signals L of the sample S by Fourier spectroscopy and includes one camera lens element 1100, at least one first optical element 1200, at least one second optical element 1300, a phase difference modulator 1400 and an image sensor 1500. The camera lens element 1100 is disposed between the sample S and the first optical element 1200, and the light signals L pass by the camera lens element 1100 and the first optical element 1200. The second optical element 1300 is spaced away from and parallel to the first optical element 1200, and the light signals L pass by the second optical element 1300 after passing by the camera lens element 1100 and the first optical element 1200. The phase difference modulator 1400 is closer to the first optical element 1200 than the second optical element 1300 to the first optical element 1200, and is configured for modifying a phase difference of adjacent two of the light signals L. The image sensor 1500 is configured for receiving the light signals L reflected from the first optical element 1200 and the second optical element 1300, and forming light interference which is transform to frequency or wavelength spectrum using Fourier transformation. The second optical element 1300 is between the first optical element 1200 and the image sensor 1500. When the light signals L pass by the camera lens element 1100, the first optical element 1200, the second optical element 1300 and the image sensor 1500 in order, the adjacent two of the light signals L are interfered by modifying the phase difference (that is, the optical path length dlncos(θ) shown in formula (3) with the phase difference modulator 1400).

After operating Fourier transforming on the light signals L, the image sensor 1500 can transmit the light signals L to a processor to generate a hyperspectral image of the sample S such as the image shown in FIG. 2. By adjusting the phase difference between the first optical element 1200 and the second optical element 1300, the light signals L transmitting through the second optical element 1300 is interfered by multiple reflections between the first optical element 1200 and the second optical element 1300, and then intensities of longer parts of wavelengths of the light signals L can be increased by constructive interference so that the overall amplitudes of peaks of the light signals L after Fourier transformation by the image sensor 1500 can be manifested to improve the accuracy of the hyperspectral image of the sample S. Therefore, the two-dimensional hyperspectral imaging system 1000 can provide both image and spatial information of the sample S at the same time without other additional detection system. The details of the two-dimensional hyperspectral imaging system 1000 are described in the following.

As shown in FIGS. 1A and 1B, each number of the first optical element 1200 and the second optical element 1300 is plural, each of the first optical elements 1200 and the second optical elements 1300 is a lens element where the light signals can reflect and transmit. In other embodiments, the first optical element and the second optical element can be other element which allows the light signals to be constructive interference, such as a mirror, a transparent film and etc., and the present disclosure is not limited thereto. A part of the light signals L reflects between the first optical element 1200 and the second optical element 1300, and the phase difference modulator 1400 is connected to the first optical element 1200 and configured for changing a distance d1 between the first optical element 1200 and the second optical element 1300. By changing the distance d1 between the first optical element 1200 and the second optical element 1300, an optical path difference between the adjacent two of the light signals L can be modulated to modify the phase difference. When one of the light signals L passes by the first optical element 1200 and enters the second optical element 1300, the aforementioned one of the light signals L reflects partially and transmits partially by the second optical element 1300, and then reflects partially by the first optical element 1200 alternately to form lights adjacent to each other, and the two lights are the aforementioned adjacent two of the light signals L. Furthermore, the phase difference between adjacent two of the light signals L can be represented by the following formula (1):

$$\Delta\varphi = \left(\frac{2\pi}{\lambda}\right)2d1. \tag{1}$$

Wherein the $\Delta\varphi$ represents the phase difference, $\lambda$ represents a wavelength of the aforementioned one of the light signals L, and the transmission intensity $I_t(\theta)$ of the light signals L passing by the first optical elements 1200 and the second optical elements 1300 can be represented by the following formulas (2) and (3):

$$I_t(\theta) = \frac{T_1 T_2}{1 + R_1 \times R_2 - 2 \times \sqrt{R_1 \times R_2} \times \cos(\theta)} ; \text{and} \tag{2}$$

$$\phi = \frac{2 \times 2 \times \pi \times d1 \times n}{\lambda} \cos(\theta). \tag{3}$$

Wherein $T_1$ represents a transmission coefficient of the first optical elements 1200, $R_1$ represents a reflectance of the first optical elements 1200, $T_2$ represents a transmission coefficient of the second optical elements 1300, $R_2$ represents a reflectance of the second optical elements 1300, and $\theta$ represent an incident angle of one of the light signals L passing by one of the first optical elements 1200; the incident angle $\theta$ is assumed 0 (normal incident) and n=1.0 if a medium between the first optical element 1200 and the second optical element 1300 is air. In the first embodiment, the phase difference modulator 1400 changes the distance d1 so that the incident angle $\theta$ equals to zero to achieve the maximum value of the transmission intensity $I_t(\theta)$. Therefore, the first optical elements 1200, the second optical elements 1300 and the phase difference modulator 1400 form a Fabry-Perot Interferometer (FPI) to increase the intensities of the light signals L by constructive interference.

Moreover, the first optical elements 1200 are arranged and spaced away from each other to form a first optical element array 1210, the second optical elements 1300 are arranged and spaced away from each other to form a second optical element array, and the first optical element array 1210 is parallel to the second optical element array. Via the configuration of a micro-array formed by the first optical element array 1210 and the second optical element array, the image sensor 1500 can receive the light signals L from different incident angles to further obtain a spatial information of the light signals L. Moreover, the image sensor 1500 is a plurality of cameras, and each of the cameras corresponds to each of the second optical elements 1300. Each of the second optical elements 1300 is disposed on each of the cameras. A size of each of the first optical elements 1200 and the second optical elements 1300 equals to a pixel size of each of the cameras. Specifically, the cameras form an array corresponding to the micro-array formed by the first optical element array 1210 and the second optical element array, and each of the cameras can obtain a pixel information of the hyperspectral image of the sample S. In other words, the hyperspectral image of the sample S can be obtained via the cameras pixel by pixel. The cameras can be CCD, CMOS, NIR or FLIR cameras. The band ranged between 300 nm to 1 um, 900 nm to 1.8 um and 900 nm to 5 um can be obtained by the CCD, NIR and FLIR cameras, respectively. Therefore, the hyperspectral image with different band range can be obtained. Moreover the image sensor 1500 can further be configured for analyzing the light signals L. Hence, each camera of the image sensor 1500 can analyze the light signals L to obtain an individual pixel hyperspectral image of the sample S.

Figure 3A:
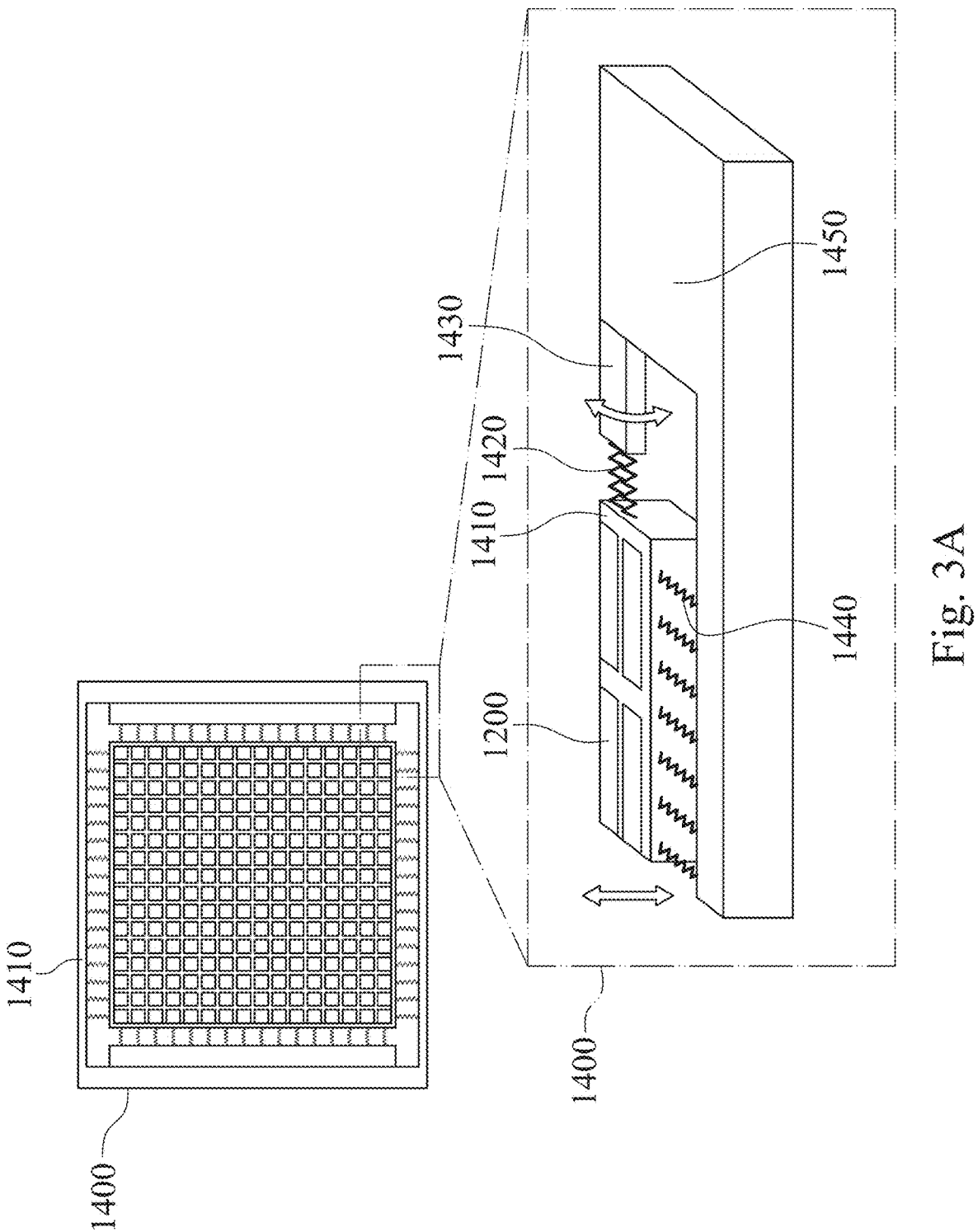
FIG. 3A shows a partial enlarged view of the first optical element and the phase difference modulator according to the first embodiment in FIG. 1A.
Figure 3B:
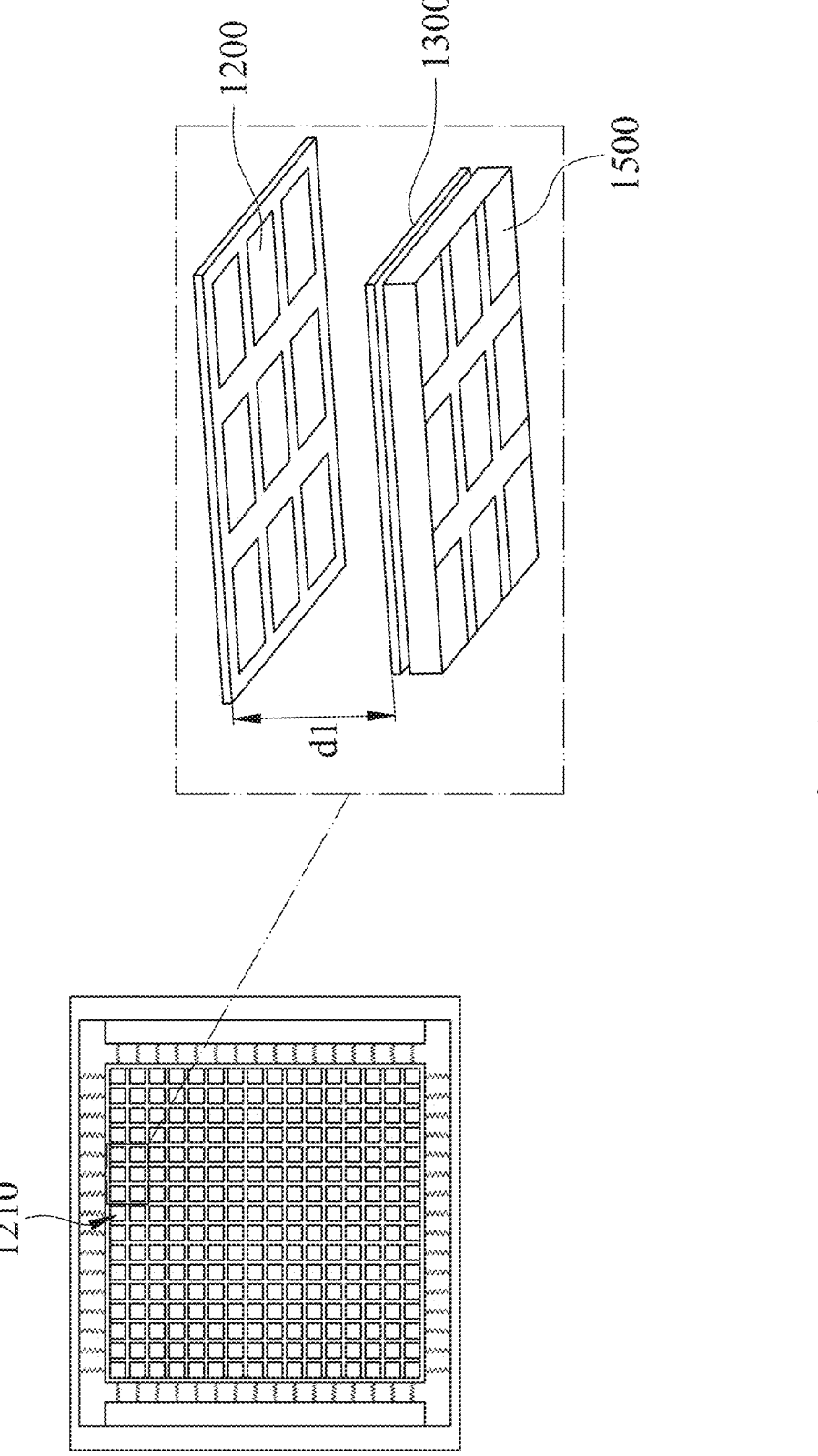
FIG. 3B shows a partial enlarged view of the first optical element, the second optical element and the phase difference modulator according to the first embodiment in FIG. 1A.

FIG. 3A shows a partial enlarged view of the first optical element 1200 and the phase difference modulator 1400 according to the first embodiment in FIG. 1A. FIG. 3B shows a partial enlarged view of the first optical element

Figure 3C:
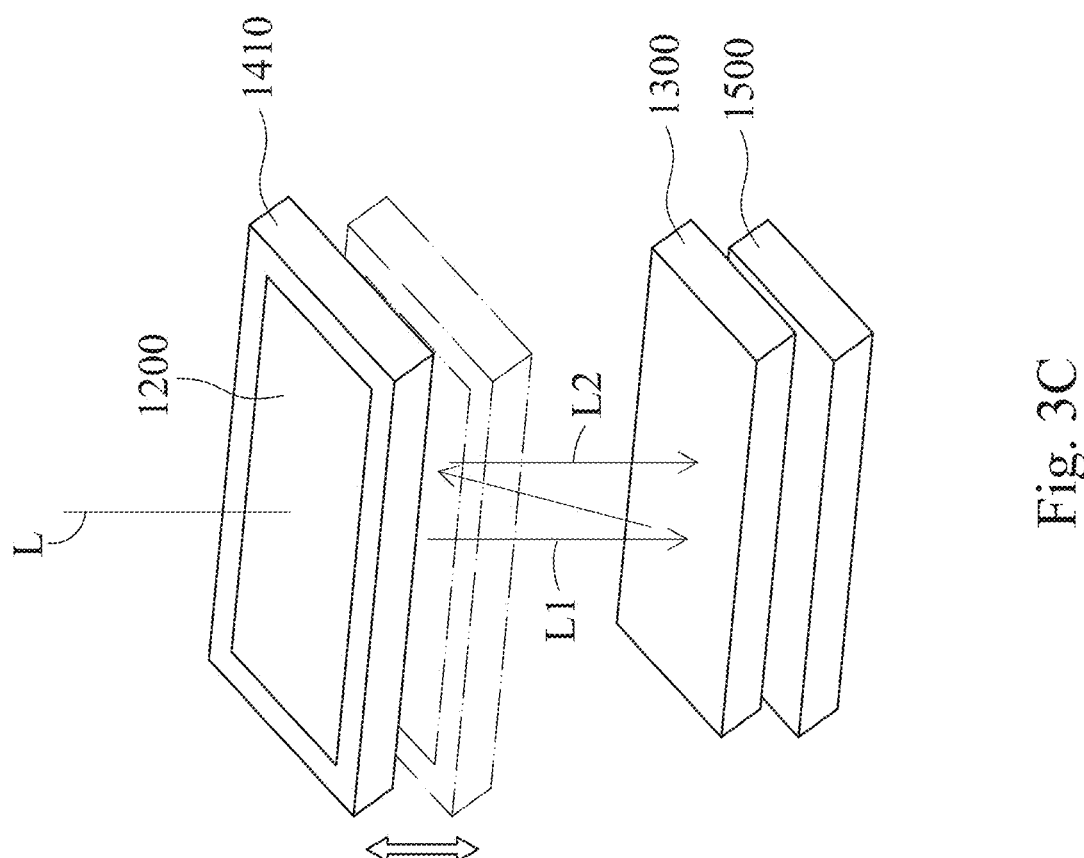
FIG. 3C shows a schematic view of the phase difference modulator driving the first optical element to move along a vertical direction according to the first embodiment in FIG. 3B.

1200, the second optical element 1300 and the phase difference modulator 1400 according to the first embodiment in FIG. 1A. FIG. 3C shows a schematic view of the phase difference modulator 1400 driving the first optical element 1200 to move along a vertical direction according to the first embodiment in FIG. 3B. As shown in FIGS. 1A, 1B and 3A to 3C, the phase difference modulator 1400 can include a frame 1410, a plurality of elastic elements 1420, an actuator assembly, a plurality of spring 1440 and a supporting frame 1450. The frame 1410 accommodates the first optical elements 1200. The elastic elements 1420 are connected to the frame 1410. The actuator assembly is connected to the elastic elements 1420 and configured for driving the first optical elements 1200 to move relatively to the second optical elements 1300 along the vertical direction. The actuator assembly includes a plurality of piezoelectric driven actuators 1430 disposed at two sides of the frame 1410, respectively. Specifically, the frame 1410 has a plurality of holes, each of the first optical elements 1200 is disposed in each hole of the frame 1410 to form the first optical element array 1210, the piezoelectric driven actuators 1430 are disposed at the supporting frame 1450, the springs 1440 are located at the other two sides of the frame 1410 and connected between the frame 1410 and the supporting frame 1450, and the supporting frame 1450 is parallel to the second optical elements array. As shown in FIG. 3A, the piezoelectric driven actuators 1430 can be bended by powering electricity to move the frame 1410 via the elastic elements 1420 such that the first optical elements 1200 can move relatively to the second optical elements 1300 along the vertical direction in order to change the distance d1 between the first optical elements 1200 and the second optical elements 1300. Therefore, the phase difference can be modified by the phase difference modulator 1400 which is used in micro electro mechanical systems (MEMS) technology for microfabrication of the two-dimensional hyperspectral imaging system 1000.

As shown in FIG. 30, when reflectance of the first optical elements 1200 is far less than reflectance of the second optical elements 1300 (R1<<R2), one of the light signals L can transmit one of the first optical elements 1200 partially to form a transmitted light L1 and reflect between the aforementioned one of the first optical elements 1200 and corresponding one of the second optical elements 1300 partially to form a reflected light L2, and the intensity I(d1) detected by the image sensor 1500 can be simplified from the formula (2) to the following formula (4):

$$I(d1) = I_1 + I_2 + 2(I_1 I_2)^{\frac{1}{2}} \cos\left(\frac{4\pi d1}{\lambda}\right). \tag{4}$$

Wherein $I_1$ represents an intensity of the transmitted light L1, $I_2$ represents an intensity of the reflected light L2, and the intensities $I_1$, $I_2$ of the transmitted light L1 and the reflected light L2 can be represented in the following formulas (5), (6):

$$I_1 = (1 - R_1)(1 - R_2)I_o; \text{and} \tag{5}$$

$$I_2 = (1 - R_1)R_2 R_1(1 - R_2)I_o. \tag{6}$$

Wherein $I_o$ represents an original intensity of the light signals L.

Figure 4:
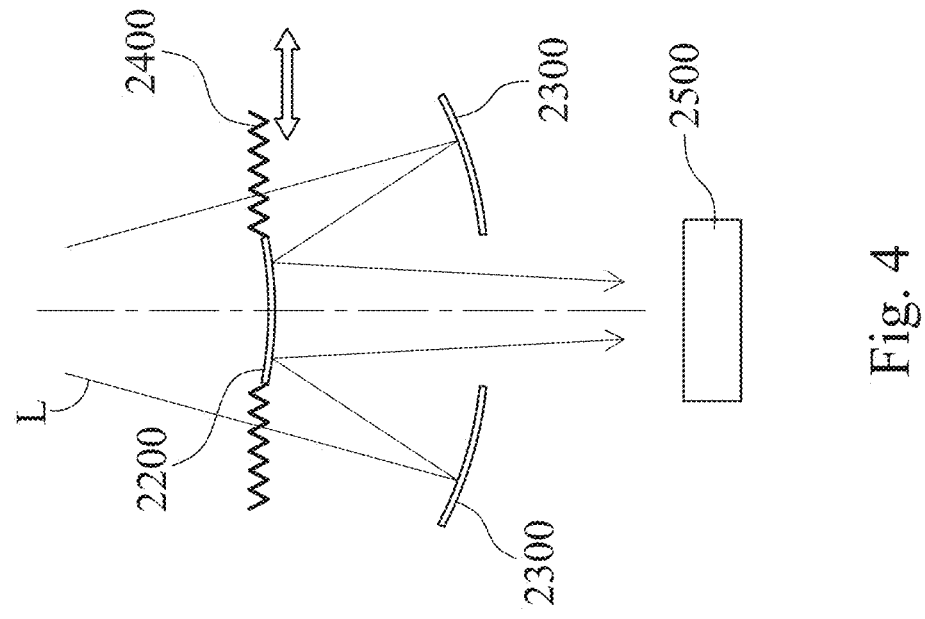
FIG. 4 shows a schematic view of a two-dimensional hyperspectral imaging system according to a second embodiment of present disclosure.

FIG. 4 shows a schematic view of a two-dimensional hyperspectral imaging system 2000 according to a second embodiment of present disclosure. The structures and configuration of the two-dimensional hyperspectral imaging system 2000 can be similar with the two-dimensional hyperspectral imaging system 1000 of the first embodiment, and the details won't be described herein again. It is worthy to be mentioned that each of first optical elements 2200 is a flat mirror, each of second optical elements 2300 is a curved mirror, each of the first optical elements 2200 is located between adjacent two of the second optical elements 2300, and a phase difference modulator 2400 is configured for driving each of the first optical elements 2200 to move to change distances from a center of each of the first optical elements to centers of the adjacent two of the second optical elements. Specifically, the phase difference modulator 2400 includes springs connected to each of the first optical elements 2200 and drives the first optical elements 2200 to move along a horizontal direction to change a reflected angle that one of light signals L reflects by one of the first optical elements 2200 after reflecting by one of the second optical elements 2300. Then, adjacent two of the light signals reflects by the adjacent two of the second optical elements 2300 can reflect by the same first optical element 2200 to form a recombined light signal with constructive interference, and one camera of an image sensor 2500 can receive the recombined light signal and operate Fourier transformation to obtain the information of the light signals L. Thus, the structures of FPI can be simplified.

Figure 5A:
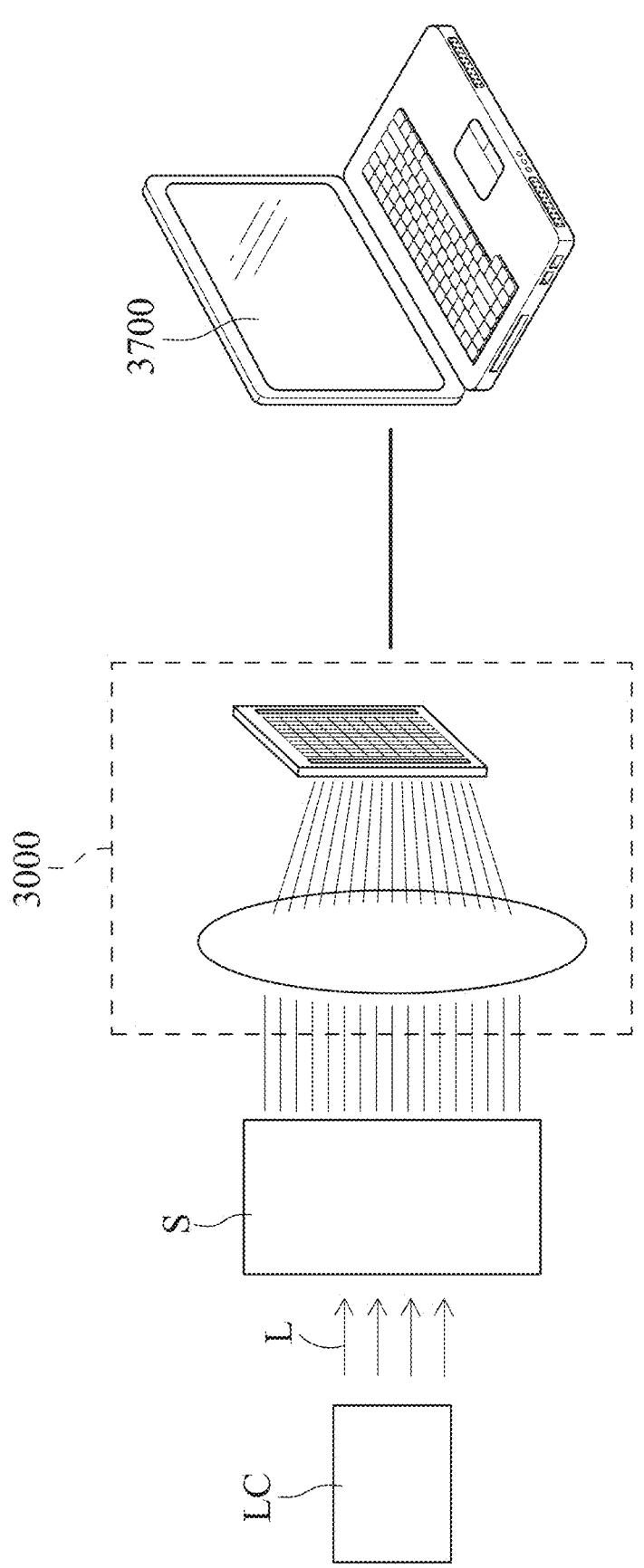
FIG. 5A shows a schematic view of a two-dimensional hyperspectral imaging system receiving light signals generated by a light source according to a third embodiment of the present disclosure.
Figure 5B:
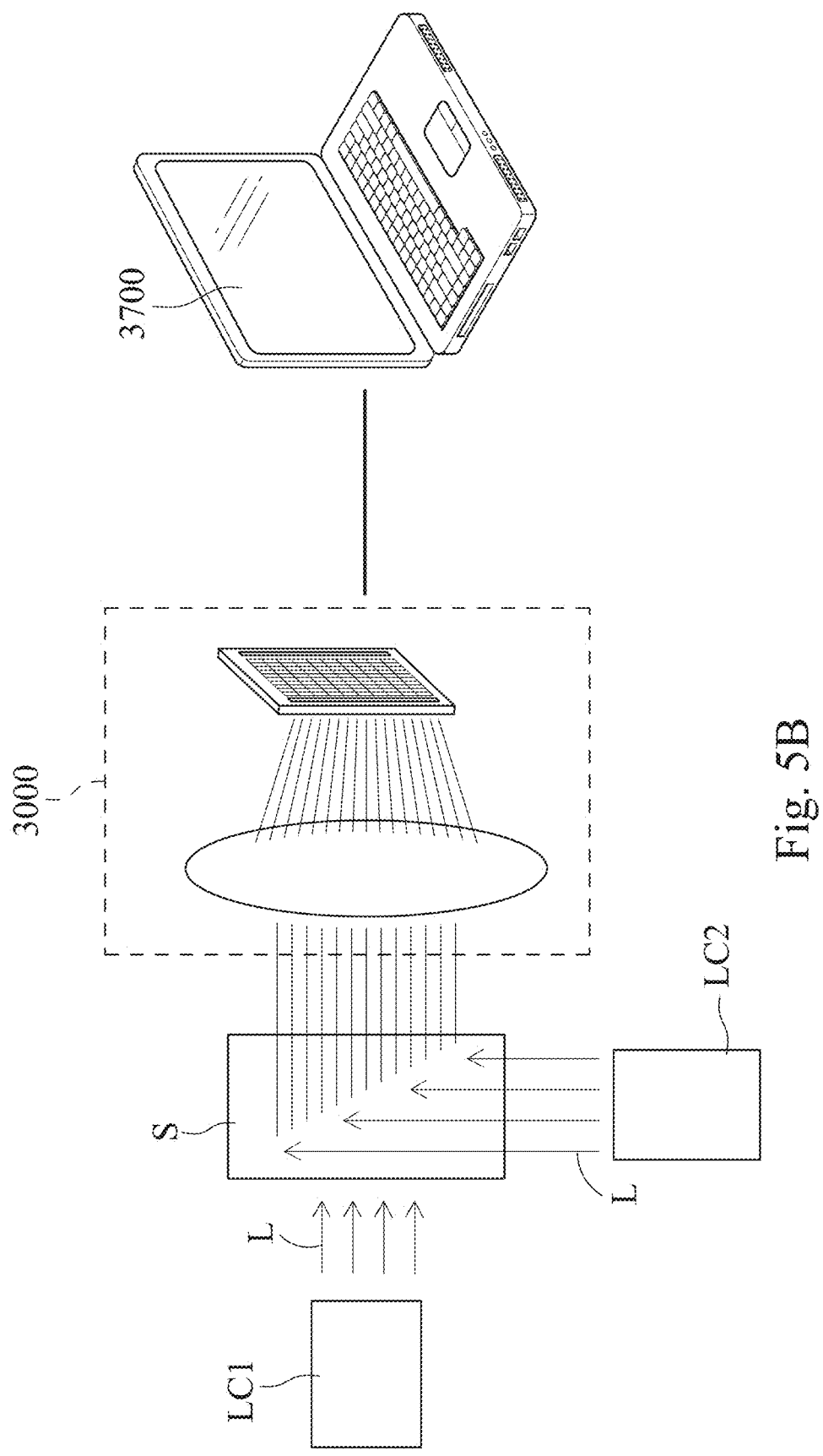
FIG. 5B shows a schematic view of a two-dimensional hyperspectral imaging system receiving light signals generated by two light sources according to the third embodiment in FIG. 5A.
Figure 6:
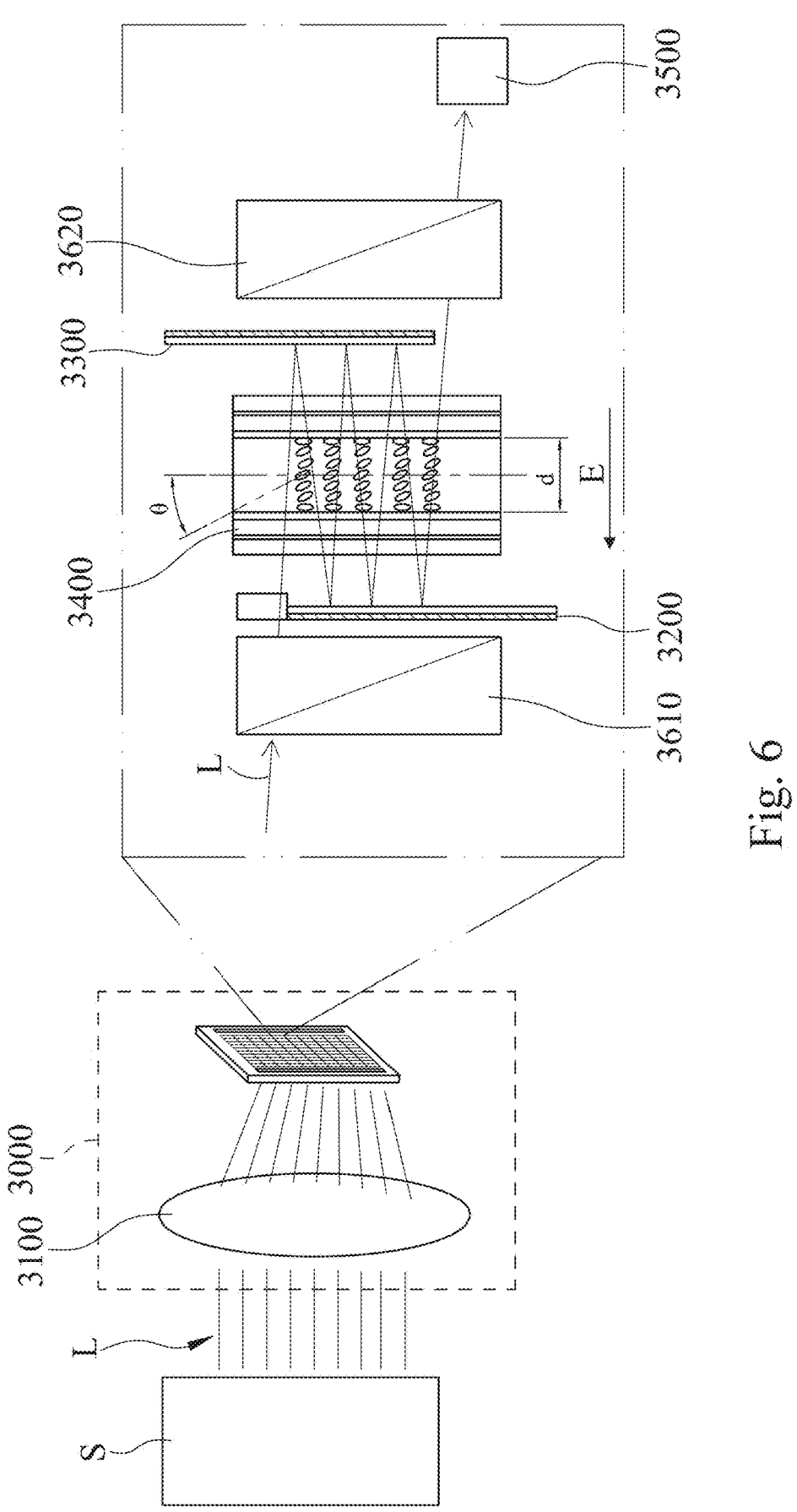
FIG. 6 shows a schematic view of the two-dimensional hyperspectral imaging system according to the third embodiment in FIG. 5A.

FIG. 5A shows a schematic view of a two-dimensional hyperspectral imaging system 3000 receiving light signals L generated by a light source LC according to a third embodiment of the present disclosure. FIG. 5B shows a schematic view of a two-dimensional hyperspectral imaging system 3000 receiving light signals L generated by two light sources LC1, LC2 according to the third embodiment in FIG. 5A. FIG. 6 shows a schematic view of the two-dimensional hyperspectral imaging system 3000 according to the third embodiment in FIG. 5A. In FIG. 5A, the light signals L generated by the single light source LC can be transmitted to pass through a sample S to image the sample S by the two-dimensional hyperspectral imaging system 3000. In FIG. 5B, a number of the light sources LC1, LC2 is two, the light signals L can be generated by the light sources LC1, LC2, a part of the light signals L can be transmitted to pass through a sample S, and the other part of the light signals L can be reflected by the sample S to pass therethrough to image the sample S by the two-dimensional hyperspectral imaging system 3000. That is, the sample S can be imaged by reflection or transmission; in other embodiments, the light signals can be generated by ambient lights to image the sample, and the present disclosure is not limited thereto. As shown in FIGS. 5A, 5B and 6, each of the light sources LC, LC1, LC2 generates a plurality of the light signals L, and the light signals L pass through a sample S and enter the two-dimensional hyperspectral imaging system 3000. The structures and configuration of the two-dimensional hyperspectral imaging system 3000 are similar with the two-dimensional hyperspectral imaging system 1000 of the first embodiment, and the same detail won't be described herein again. It is worthy to be mentioned that the light signals L reflect between first optical elements 3200 and second optical elements 3300, a phase difference modulator 3400 includes a plurality of liquid crystal cells with a fixed width d, each of the liquid crystal cells is disposed between each of the first optical elements 3200 and each of the second optical elements 3300, and the liquid crystal cells are configured for modifying an optical path difference of the adjacent two of the light signals L having the same polarizing direction by altering a controlled voltage. Refraction index of the liquid crystal cells can be modified by changing an aligned angle θ of the liquid crystal cells to modify the optical path difference of the adjacent two of the light signals L. Without changing a physical distance between the first optical elements 3200 and the second optical elements 3300, the optical path difference can be modified with adding an electric field E by altering the controlled voltage.

Furthermore, each of the first optical elements 3200 and the second optical elements 3300 is a flat mirror, the phase difference modulator 3400 can further include two polarizers 3610, 3620, the polarizer 3610 is disposed between the sample S and the one of the first optical elements 3200, the polarizer 3620 is disposed between one of the second optical elements 3300 correspond to the aforementioned one of the first optical elements 3200 and the image sensor 3500. The polarizer 3610 can polarize the light signals L first such that the light signals L have a same polarization direction, and the polarizer 3620 polarizes the light signals L with a wanted polarization direction for the following analyzing. Specifically, the image sensor 3500 can include a plurality of photo diode, and each of the photo diode corresponds to each of the second optical elements 3300. The two-dimensional hyperspectral imaging system 3000 can further include an electronic device 3700 signally connected to the image sensor 3500. The electronic device 3700 is configured for imaging the light signals L. Therefore, the light signals L of the sample S can pass by a lens element 3100 and enters a micro-array formed by the polarizers 3610, 3620, the first optical elements 3200, the second optical elements 3300 and the image sensor 3500 to obtain a hyperspectral image of the sample S by the electronic device 3700.

Figure 7:
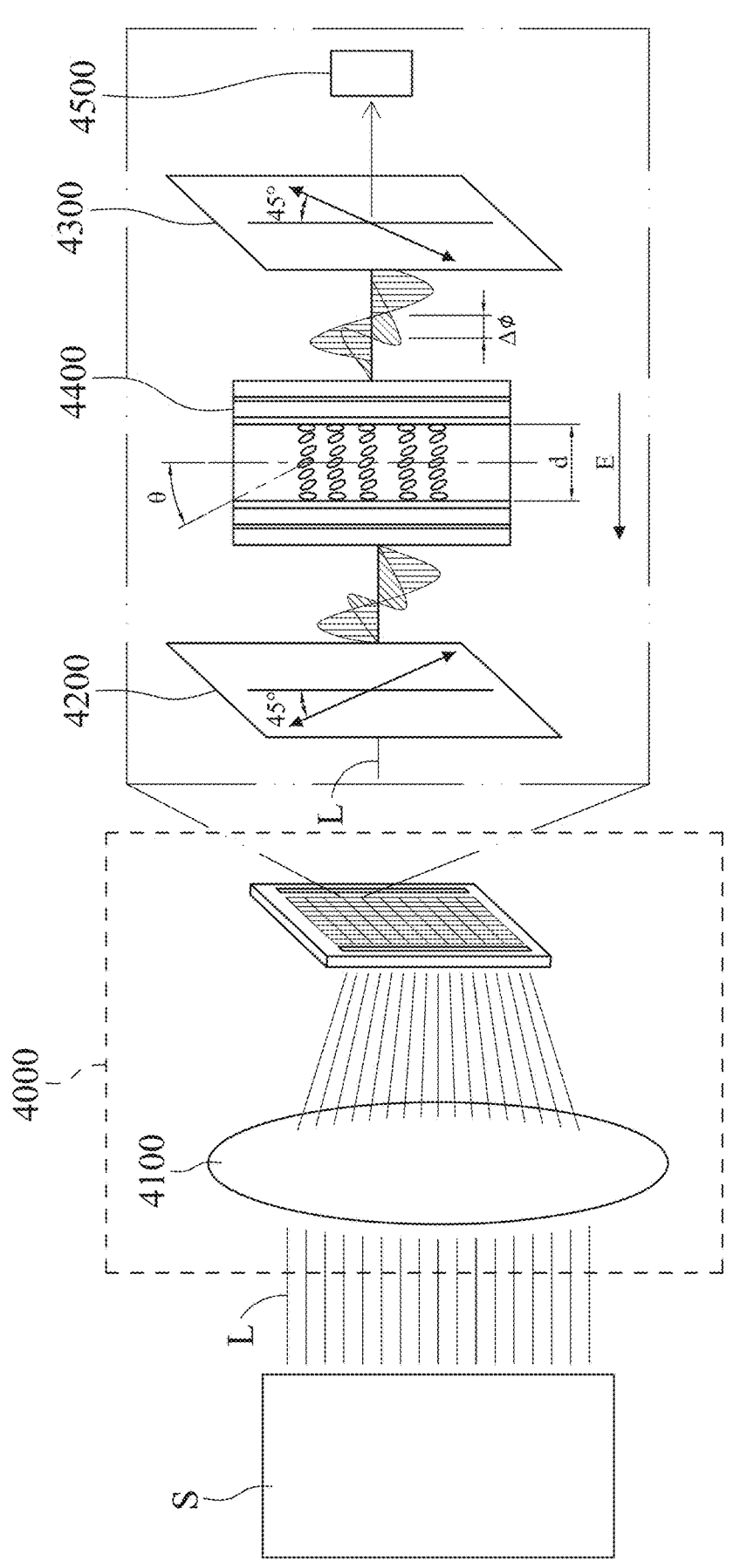
FIG. 7 shows a schematic view of a two-dimensional hyperspectral imaging system according to a fourth embodiment of present disclosure.

FIG. 7 shows a schematic view of a two-dimensional hyperspectral imaging system 4000 according to a fourth embodiment of present disclosure. The structures and configuration of the two-dimensional hyperspectral imaging system 4000 are similar with the two-dimensional hyperspectral imaging system 3000 of the third embodiment, and the details won't be described herein again. Light signals L of a sample S pass by a lens element 4100 and enter a micro-array formed by at least one first optical element 4200, a phase difference modulator 4400, at least one second optical element 4300 and an image sensor 4500. The difference is that each of the first optical element 4200 and the second optical element 4300 is a polarizer film, the first optical element 4200 is configured for polarizing each of the light signals L orthogonally, the liquid crystal cell of the phase difference modulator 4400 is configured for changing refractive index of the light signals in different directions, so that the adjacent two of the light signals L are constructive interference after passing by the second optical element 4300. Specifically, the first optical element 4200 can polarize the light signals L with a polarization angle of 45 degrees first, and the liquid crystal cell can split one of the light signals L into an ordinary and an extraordinary light which are the adjacent two of the light signals, and a phase difference Δø between the ordinary and the extraordinary light is modified by changing an aligned angle θ of the liquid crystal cell with an extra electric field E such that the ordinary and the extraordinary light can be constructive interference after passing by the second optical element 4300.

The two-dimensional hyperspectral imaging systems 3000, 4000 including liquid crystal cell with a fixed width d can modify the phase difference without changing the physical distance between the first optical elements and the second optical elements to further improve the stability of the system.

Figure 8B:
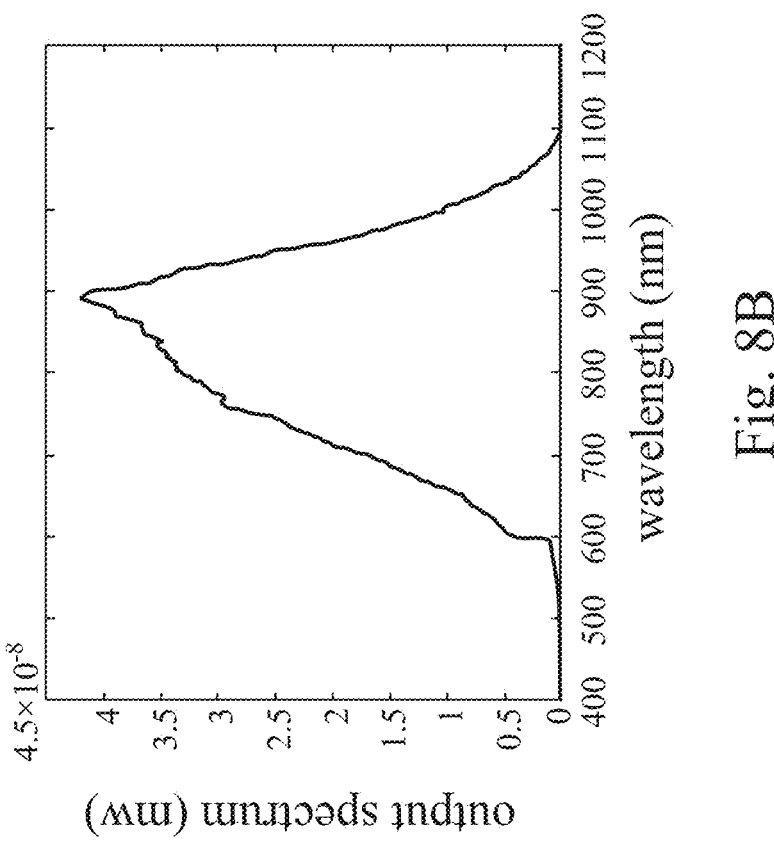
FIG. 8B shows an example relation between the output spectrum and wavelength of the light signals of the light source obtained by the two-dimensional hyperspectral imaging system according to the fourth embodiment in FIG. 7.
Figure 8A:
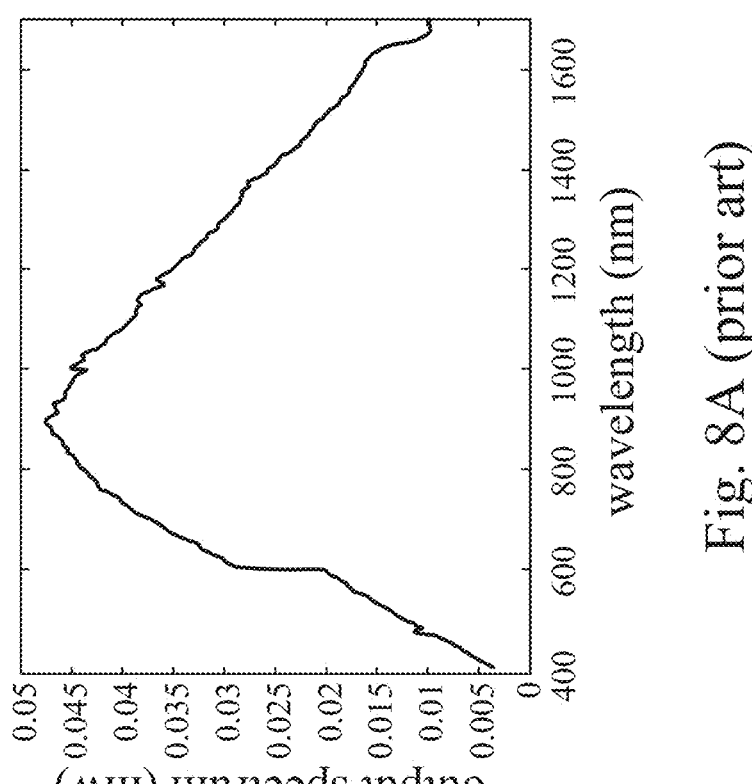
FIG. 8A shows an example relation between the output spectrum and wavelength of the light signals of a light source measured by a conventional spectrometer.

FIG. 8A shows an example relation between the output spectrum and wavelength of the light signals L of a light source measured by a conventional spectrometer. FIG. 8B shows an example relation between the output spectrum and wavelength of the light signals L of the light source obtained by the two-dimensional hyperspectral imaging system 4000 according to the fourth embodiment in FIG. 7. The light source is a tungsten halogen light source, but the present disclosure is not limited thereto. Specifically, the photo diodes of the image sensor 4500 are silicon based detectors. As shown in FIGS. 8A and 8B, compared with the output spectrum directly obtained by the conventional spectrometer, the output spectrum obtained by the two-dimensional hyperspectral imaging system 4000 is ranged from 600 nm to 900 nm which is enough to test various types of samples, and a drop of the spectral response above 900 nm is due to the measurement by the silicon based photo diodes.

Figure 9:
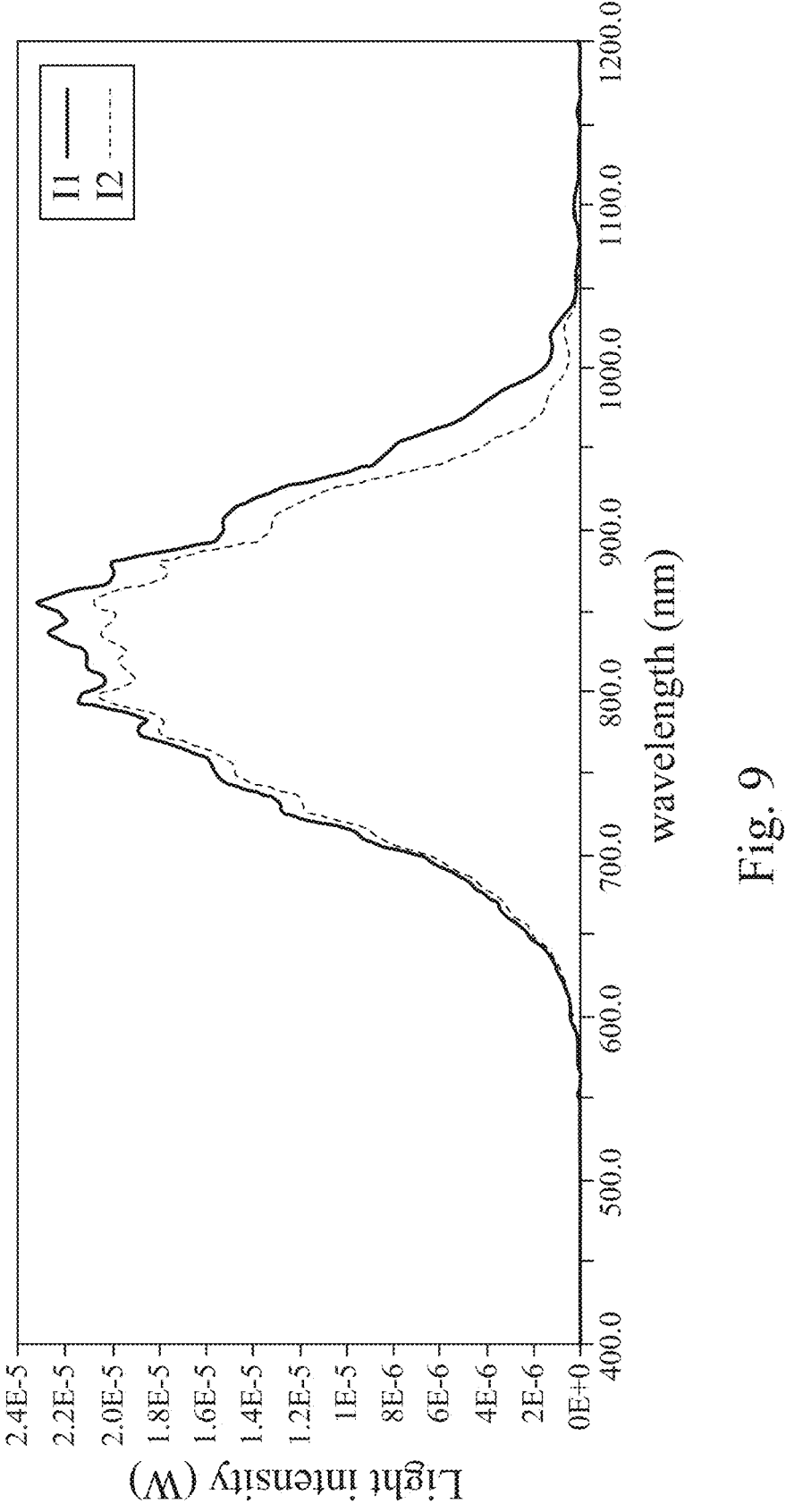
FIG. 9 shows an example relation between light intensities and wavelengths of the light signals obtained by the two-dimensional hyperspectral imaging system according to the fourth embodiment in FIG. 7.

In the following FIGS. 9 to 12B, the measurement is obtained by the one single photo diode of the image sensor 4500 to illustrate the intensity or the spectral information of one pixel of the two-dimensional hyperspectral imaging system 4000. FIG. 9 shows an example relation between light intensities and wavelengths of the light signals L obtained by the two-dimensional hyperspectral imaging system 4000 according to the fourth embodiment in FIG. 7. As shown in FIG. 9, I1 represents a spectrum of the light signals L obtained by the two-dimensional hyperspectral imaging system 4000 without passing by the sample S, I2 represents a spectrum of the light signals L obtained by the two-dimensional hyperspectral imaging system 4000 with passing by the sample S, and the sample S is deionized (DI) water.

Figures 10A, 10B:
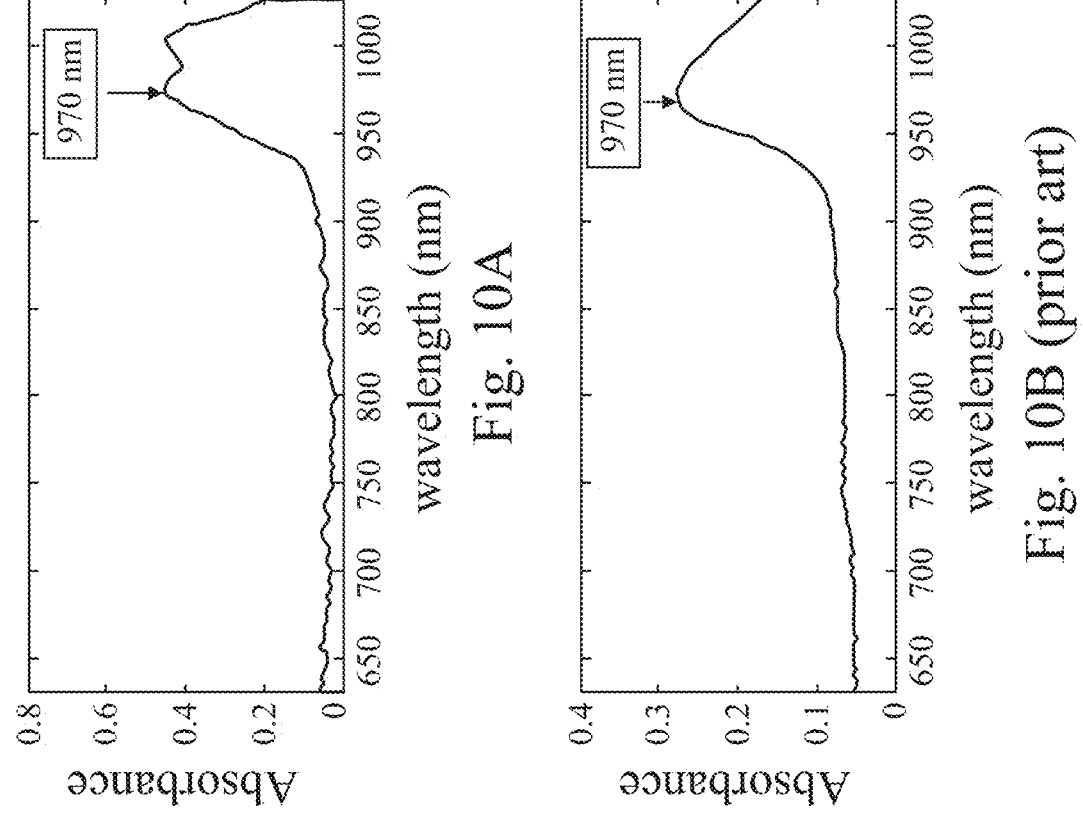
FIG. 10A shows an example relation between absorbance and wavelength of the light signals of the sample obtained by the two-dimensional hyperspectral imaging system according to the fourth embodiment in FIG. 7.
FIG. 10B shows an example relation between absorbance and wavelength of the light signals of the sample obtained by the conventional spectrometer.
Figures 11A, 11B:
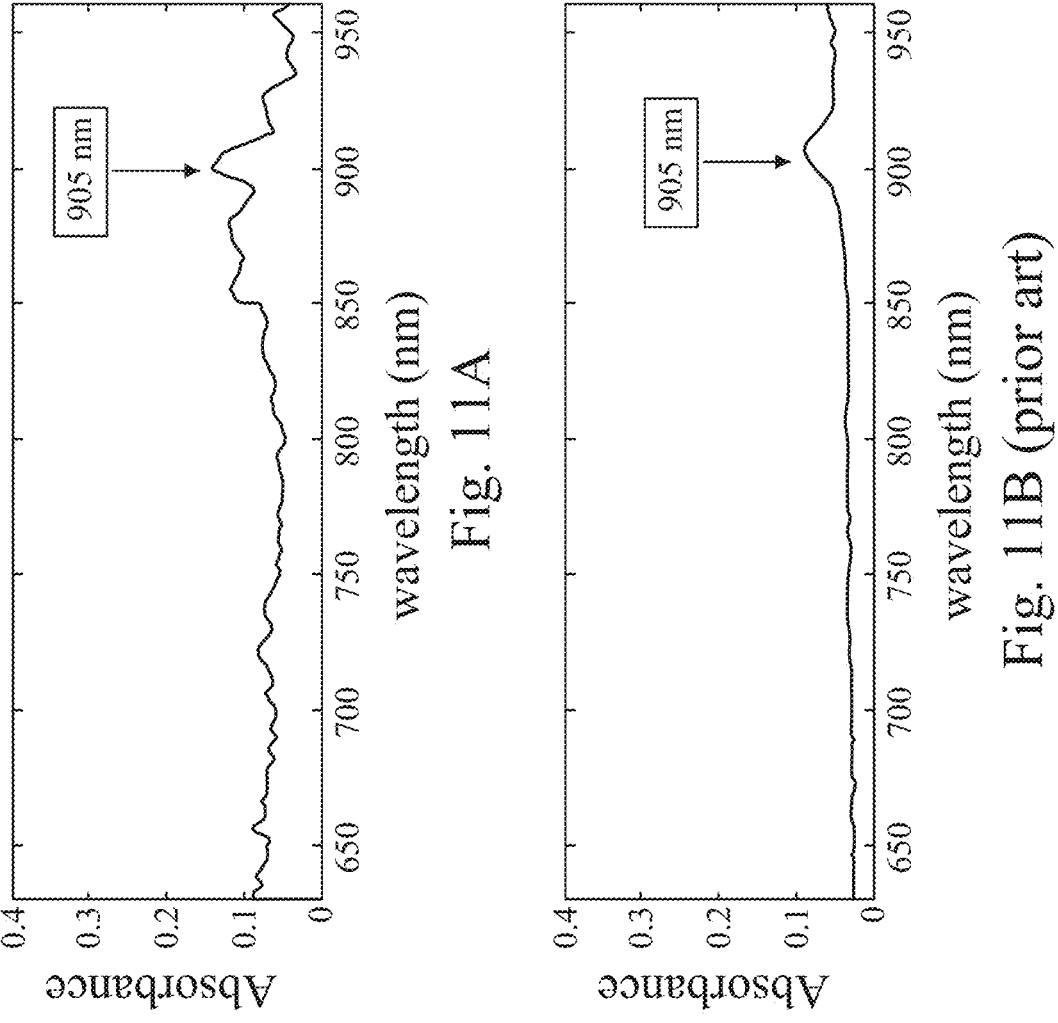
FIG. 11A shows an example relation between absorbance and wavelength of the light signals of isopropyl alcohol obtained by the two-dimensional hyperspectral imaging system according to the fourth embodiment in FIG. 7.
FIG. 11B shows an example relation between absorbance and wavelength of the light signals of isopropyl alcohol obtained by the conventional spectrometer.
Figures 12A, 12B:
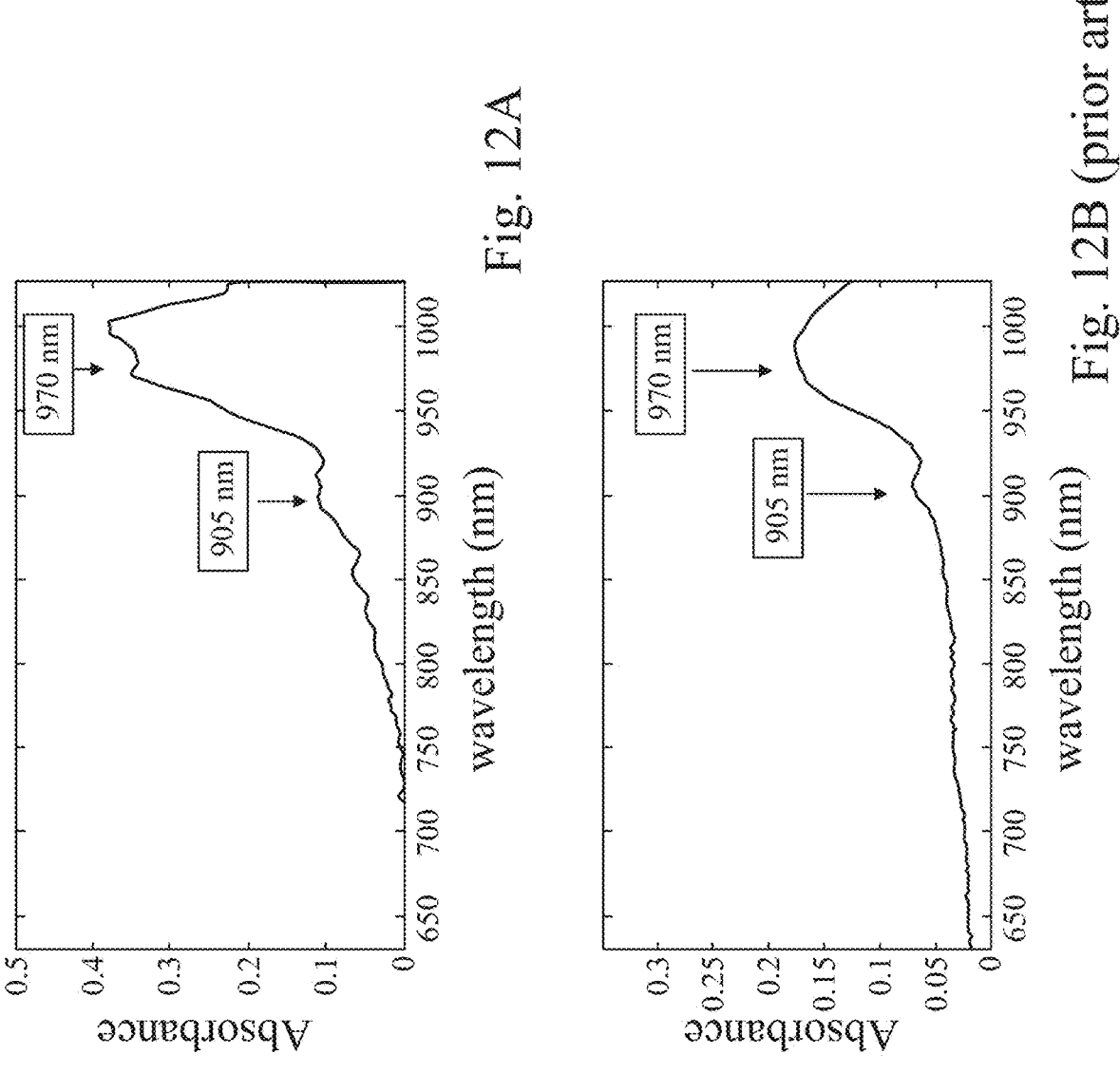
FIG. 12A shows an example relation between absorbance and wavelength of the light signals of a mixture of deionized water and isopropyl alcohol obtained by the two-dimensional hyperspectral imaging system according to the fourth embodiment in FIG. 7.
FIG. 12B shows an example relation between absorbance and wavelength of the light signals of a mixture of deionized water and isopropyl alcohol obtained by the conventional spectrometer.

FIG. 10A shows an example relation between absorbance and wavelength of the light signals L of the sample S obtained by the two-dimensional hyperspectral imaging system 4000 according to the fourth embodiment in FIG. 7. FIG. 10B shows an example relation between absorbance and wavelength of the light signals L of the sample S obtained by the conventional spectrometer. FIG. 11A shows an example relation between absorbance and wavelength of the light signals L of isopropyl alcohol (IPA) obtained by the two-dimensional hyperspectral imaging system 4000 according to the fourth embodiment in FIG. 7. FIG. 11B shows an example relation between absorbance and wavelength of the light signals L of isopropyl alcohol obtained by the conventional spectrometer. FIG. 12A shows an example relation between absorbance and wavelength of the light signals L of a mixture of deionized water and isopropyl alcohol obtained by the two-dimensional hyperspectral imaging system 4000 according to the fourth embodiment in FIG. 7. FIG. 12B shows an example relation between absorbance and wavelength of the light signals L of a mixture of deionized water and isopropyl alcohol obtained by the conventional spectrometer. In FIGS. 10A, 11A and 12A, the spectral deviation above 900 nm is mainly due to the measurement by the silicon based photo diodes, so the spectrum above 900 nm does not correspond to the sample S. In FIGS. 10A to 12B, the absorbance of the light signals L is normalized to the input intensity, so there is no unit of the absorbance. As shown in FIGS. 10A to 12B, peaks of the absorbance spectrum of the light signals L obtain by the two-dimensional hyperspectral imaging system 4000 are more clear than the peaks of the absorbance spectrum obtain by the conventional spectrometer.

Figure 13:
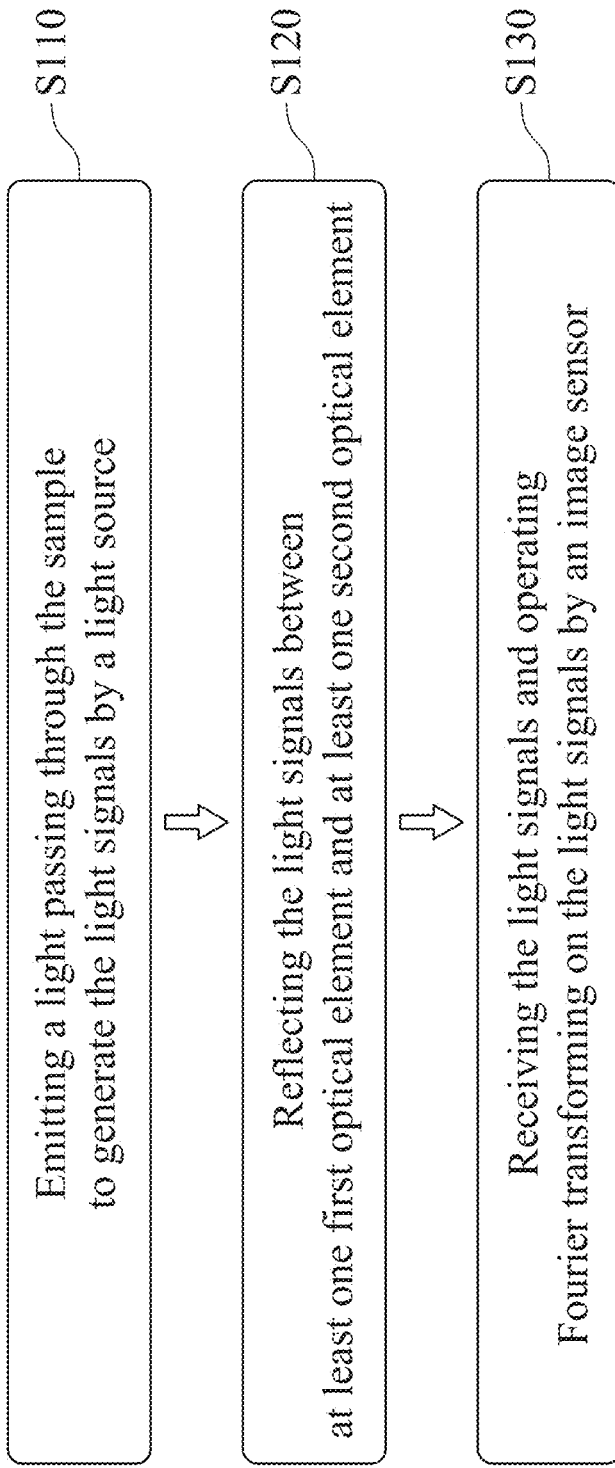
FIG. 13 shows a block diagram of a two-dimensional hyperspectral imaging method according to a fifth embodiment of the present disclosure.

FIG. 13 shows a block diagram of a two-dimensional hyperspectral imaging method S100 according to a fifth embodiment of the present disclosure. The two-dimensional hyperspectral imaging method S100 is described with the two-dimensional hyperspectral imaging system 1000 of the first embodiment, but the present disclosure is not limited thereto. As shown in FIG. 13, the two-dimensional hyperspectral imaging method S100 is for imaging a plurality of light signals L of a sample S by Fourier transformation and includes steps S110, S120, S130. The step S110 is emitting a light passing through the sample S to generate the light signals L by a light source. The step S120 is reflecting the light signals L between at least one first optical element 1200 and at least one second optical element 1300, wherein a phase difference between adjacent two of the light signals L is modified to be constructive interference by a phase difference modulator 1400. The step S130 is receiving the light signals L and operating Fourier transforming on the light signals L by an image sensor 1500. Thus, a hyperspectral image of the sample S can be obtained by a simplified method.

The phase difference between the adjacent two of the light signals L can be modified by changing a distance between the first optical element 1200 and the second optical element 1300 along a vertical direction or other directions. In other embodiments, the phase difference between the adjacent two of the light signals can be modified by disposing a liquid crystal cell between the first optical element and the second optical element, but the present disclosure is not limited thereto.

Figure 14:
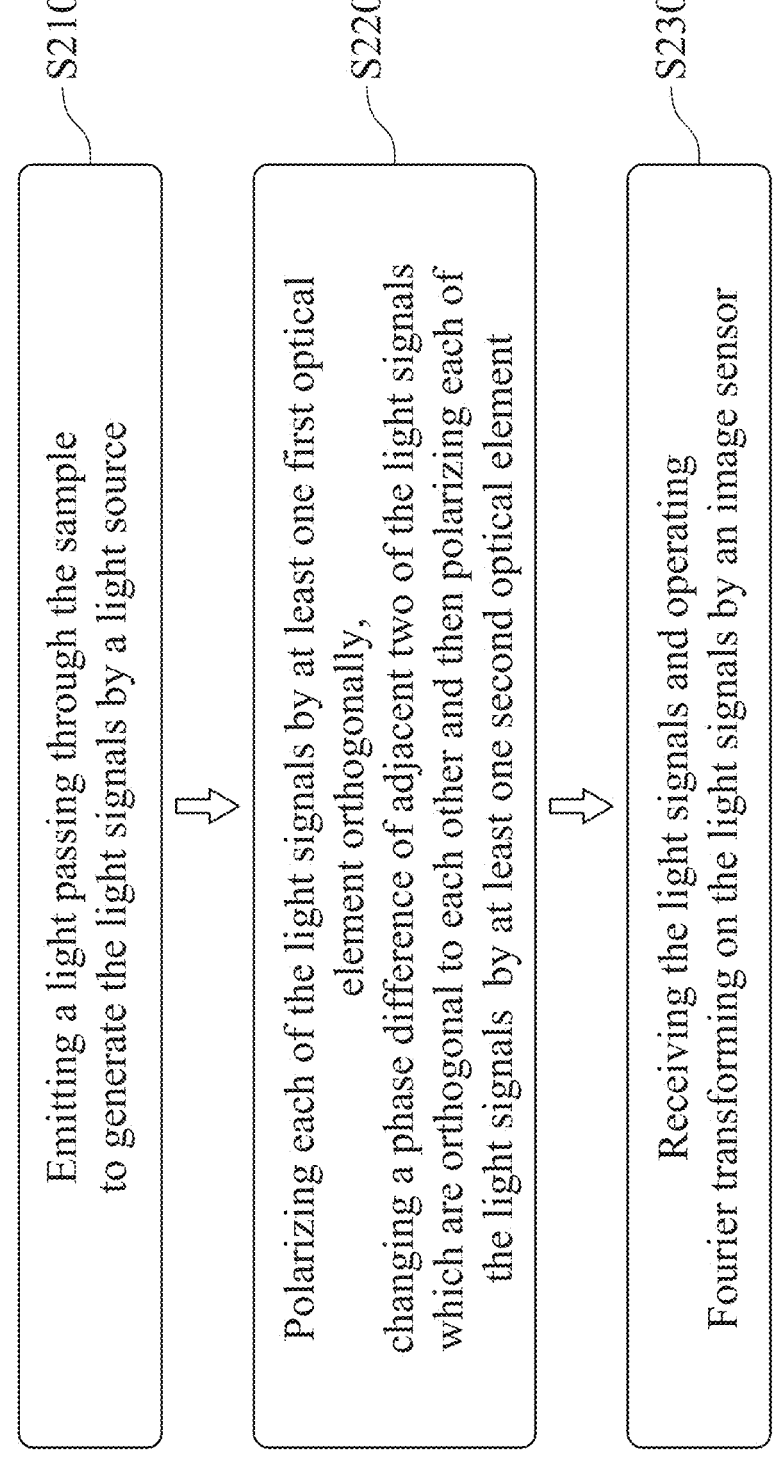
FIG. 14 shows a block diagram of a two-dimensional hyperspectral imaging method according to a sixth embodiment of the present disclosure.

FIG. 14 shows a block diagram of a two-dimensional hyperspectral imaging method S200 according to a sixth embodiment of the present disclosure. The two-dimensional hyperspectral imaging method S200 is described with the two-dimensional hyperspectral imaging system 4000 of the fourth embodiment, but the present disclosure is not limited thereto. As shown in FIG. 14, the two-dimensional hyperspectral imaging method S200 is for imaging a plurality of light signals L of a sample S by Fourier transformation and includes steps S210, S220, S230. The step S210 is emitting a light passing through the sample S to generate the light signals L by a light source. The step S220 is polarizing each of the light signals L by at least one first optical element 4200 orthogonally, changing a phase difference of adjacent two of the light signals L which are orthogonal to each other and then polarizing each of the light signals L by at least one second optical element 4300, so that the adjacent two of the light signals L which are orthogonal to each other are constructive interference. The step S230 is receiving the light signals L and operating Fourier transforming on the light signals L by an image sensor 4500. Thus, a hyperspectral image of the sample S can be obtained by a simplified method. Therefore, the phase difference can be modified by polarizing the light signals to obtain the hyperspectral image of the sample S.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A two-dimensional hyperspectral imaging system, for imaging a plurality of light signals of a sample by Fourier spectroscopy, comprising:

at least one first optical element, wherein the light signals pass by the at least one first optical element;

at least one second optical element being spaced away from and parallel to the at least one first optical element, wherein the light signals pass by the at least one second optical element;

a phase difference modulator being closer to the at least one first optical element than the at least one second optical element to the at least one first optical element, and configured for modifying a phase difference of the adjacent two of the light signals, wherein the phase difference modulator comprises an electrically activated liquid crystal cell integrated within a Fabry-Perot interferometer; and an image sensor configured for receiving the light signals reflected from the at least one first optical element and the at least one second optical element, and Fourier transforming the light signals, wherein the at least one second optical element is between the at least one first optical element and the image sensor;

wherein the light signals pass by the at least one first optical element, the at least one second optical element and the image sensor in order, and the adjacent two of the light signals are made to constructively interfere by modifying the phase difference with the phase difference modulator;

wherein a part of the light signals reflects between the at least one first optical element and the at least one second optical element, the phase difference modulator is connected to the at least one first optical element and configured for changing a distance between the at least one first optical element and the at least one second optical element;

wherein the phase difference modulator comprises:

a frame accommodating the at least one first optical element;

an elastic element connected to the frame; and an actuator assembly connected to the elastic element, and configured for driving the at least one first optical element to move relatively to the at least one second optical element along a vertical direction;

wherein the actuator assembly comprises a plurality of piezoelectric driven actuators, and the piezoelectric driven actuators are disposed at two sides of the frame.

2. The two-dimensional hyperspectral imaging system of claim 1, wherein a number of the at least one second optical element is plural, the image sensor is a plurality of cameras, and each of the cameras corresponds to each of the second optical elements.

3. The two-dimensional hyperspectral imaging system of claim 2, wherein a number of the at least one first optical element is plural, the first optical elements are arranged and spaced away from each other to form a first optical element array, the second optical elements are arranged and spaced away from each other to form a second optical element array, and the first optical element array is parallel to the second optical element array.

4. The two-dimensional hyperspectral imaging system of claim 3, wherein a size of each of the first optical elements and the second optical elements equals to a pixel size of each of the cameras.

5. The two-dimensional hyperspectral imaging system of claim 3, wherein each of the first optical elements is a flat mirror, each of the second optical elements is a curved mirror, each of the first optical elements is located between adjacent two of the second optical elements, and the phase difference modulator is configured for driving each of the first optical elements to move to change distances from a center of each of the first optical elements to centers of the adjacent two of the second optical elements.

6. The two-dimensional hyperspectral imaging system of claim 1, wherein the electrically activated liquid crystal cell disposed between the at least one first optical element and the at least one second optical element, and each of the at least one first optical element and the at least one second optical element is a polarizer film, the at least one first optical element is configured for polarizing each of the light signals orthogonally, the electrically activated liquid crystal cell is configured for changing refractive index of the light signals in different directions, so that the adjacent two of the light signals constructively interfere after passing by the at least one second optical element.

7. The two-dimensional hyperspectral imaging system of claim 1, wherein the light signals reflect between the at least one first optical element and the at least one second optical element, the electrically activated liquid crystal cell disposed between the at least one first optical element and the at least one second optical element, and the electrically activated liquid crystal cell is configured for modifying an optical path difference of the adjacent two of the light signals having a same polarizing direction by altering a controlled voltage.

8. The two-dimensional hyperspectral imaging system of claim 7, wherein the phase difference modulator further comprises two polarizers, one of the two polarizers is disposed between the sample and the at least one first optical element, the other one of the two polarizers is disposed between the at least one second optical element and the image sensor.

9. The two-dimensional hyperspectral imaging system of claim 7, wherein the image sensor comprises a photo diode.

10. The two-dimensional hyperspectral imaging system of claim 1, wherein the image sensor is configured for analyzing the light signals.

11. The two-dimensional hyperspectral imaging system of claim 1, further comprising:

an electronic device signally connected to the image sensor, wherein the electronic device is configured for imaging the light signals.

12. A two-dimensional hyperspectral imaging method, for imaging a plurality of light signals of a sample by Fourier spectroscopy, comprising:

emitting a light passing through the sample to generate the light signals by a light source;

reflecting the light signals by at least one first optical element and at least one second optical element;

modifying a phase difference between adjacent two of the light signals by a phase difference modulator, wherein the phase difference modulator comprises an electrically activated liquid crystal cell integrated within a Fabry-Perot interferometer; and receiving the light signals and Fourier transforming the light signals by an image sensor;

wherein a part of the light signals reflects between the at least one first optical element and the at least one second optical element, the phase difference modulator is connected to the at least one first optical element and configured for changing a distance between the at least one first optical element and the at least one second optical element;

wherein the phase difference modulator comprises:

a frame accommodating the at least one first optical element;

an elastic element connected to the frame; and an actuator assembly connected to the elastic element, and configured for driving the at least one first optical element to move relatively to the at least one second optical element along a vertical direction;

wherein the actuator assembly comprises a plurality of piezoelectric driven actuators, and the piezoelectric driven actuators are disposed at two sides of the frame.

13. The two-dimensional hyperspectral imaging method of claim 12, wherein the phase difference between the adjacent two of the light signals is modified by changing the distance between the at least one first optical element and the at least one second optical element.

14. The two-dimensional hyperspectral imaging method of claim 13, wherein the phase difference between the adjacent two of the light signals is modified by changing the distance between the at least one first optical element and the at least one second optical element along a vertical direction.

15. The two-dimensional hyperspectral imaging method of claim 12, wherein a number of the at least one first optical element is plural, a number of the at least one second optical element is plural, the first optical elements are arranged and spaced away from each other to form a first optical element array, the second optical elements are arranged and spaced away from each other to form a second optical element array, and the first optical element array is parallel to the second optical element array.

16. The two-dimensional hyperspectral imaging method of claim 12, wherein the phase difference between the adjacent two of the light signals is modified by disposing the electrically activated liquid crystal cell between the at least one first optical element and the at least one second optical element.

17. A two-dimensional hyperspectral imaging method, for imaging a plurality of light signals of a sample by Fourier transformation, comprising:

emitting a light passing through the sample to generate the light signals by a light source;

polarizing each of the light signals by at least one first optical element orthogonally;

modifying a phase difference of adjacent two of the light signals which are orthogonal to each other using a phase difference modulator, wherein the phase difference modulator comprises an electrically activated liquid crystal cell integrated within a Fabry-Perot interferometer;

polarizing each of the light signals by at least one second optical element, so that the adjacent two of the light signals which are orthogonal to each other are made to constructively interfere; and receiving the light signals and Fourier transforming the light signals by an image sensor;

wherein the electrically activated liquid crystal cell of the phase difference modulator is configured for changing refractive index of the light signals in different directions, the electrically activated liquid crystal cell splits one of the light signals into an ordinary and an extraordinary light which are the adjacent two of the light signals, and a phase difference between the ordinary and the extraordinary light is modified by changing an aligned angle of the electrically activated liquid crystal cell with an extra electric field;

wherein a part of the light signals reflects between the at least one first optical element and the at least one second optical element, the phase difference modulator is connected to the at least one first optical element and configured for changing a distance between the at least one first optical element and the at least one second optical element;

wherein the phase difference modulator comprises:

a frame accommodating the at least one first optical element;

an elastic element connected to the frame; and an actuator assembly connected to the elastic element, and configured for driving the at least one first optical element to move relatively to the at least one second optical element along a vertical direction;

wherein the actuator assembly comprises a plurality of piezoelectric driven actuators, and the piezoelectric driven actuators are disposed at two sides of the frame.

* * * * *